(12) United States Patent
Kwon et al.

(10) Patent No.: US 9,622,267 B2
(45) Date of Patent: Apr. 11, 2017

(54) SYSTEMS AND METHODS FOR MULTI-USER SIMULTANEOUS TRANSMISSIONS

(71) Applicant: NEWRACOM, INC., Irvine, CA (US)

(72) Inventors: Young Hoon Kwon, Irvine, CA (US); Ahmad Reza Hedayat, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 0 days.

(21) Appl. No.: 15/193,368

(22) Filed: Jun. 27, 2016

(65) Prior Publication Data

US 2016/0309514 A1    Oct. 20, 2016

Related U.S. Application Data

(63) Continuation of application No. 14/827,224, filed on Aug. 14, 2015, now Pat. No. 9,408,184, which is a
(Continued)

(51) Int. Cl.
*H04W 74/08* (2009.01)
*H04W 72/00* (2009.01)
(Continued)

(52) U.S. Cl.
CPC ...... *H04W 74/0816* (2013.01); *H04B 7/0452* (2013.01); *H04W 4/06* (2013.01);
(Continued)

(58) Field of Classification Search
CPC .. H04W 72/0446; H04W 84/12; H04W 84/18
See application file for complete search history.

(56) References Cited

U.S. PATENT DOCUMENTS

| 8,582,485 B2 | 11/2013 | Fischer et al. |
| 2013/0286959 A1 | 10/2013 | Lou et al. |
| 2014/0160966 A1 | 6/2014 | Kang et al. |

FOREIGN PATENT DOCUMENTS

| WO | WO 2011/121373 A1 | 10/2011 |
| WO | WO 2013/157787 A1 | 10/2013 |

OTHER PUBLICATIONS

International Search Report and Written Opinion for PCT/US2015/043502, filed Aug. 3, 2015.
(Continued)

*Primary Examiner* — Hassan Phillips
*Assistant Examiner* — Prenell Jones

(57) ABSTRACT

Systems, methods, and devices are provided for protecting a multiuser (MU) transmission between an access point and a plurality of wireless stations. The access point may transmit a frame that is addressed to multiple stations in a wireless network. Each of the stations addressed by the frame may respond with an identical clear-to-send frame. In some instances, the clear-to-send frames transmitted by each wireless station may utilize the same scrambling code utilized by the frame transmitted by the access point, use the same modulation and coding scheme, and/or occupy the same frequency bands such that the multiple clear-to-send frames are combined in the air and detected as a single frame by the access point. In some instances, the access point may thereafter transmit an uplink reference frame to trigger the wireless stations to transmit an uplink data request frame to the access point.

21 Claims, 13 Drawing Sheets

Related U.S. Application Data continuation of application No. PCT/US2015/043502, filed on Aug. 3, 2015.

(60) Provisional application No. 62/032,447, filed on Aug. 1, 2014, provisional application No. 62/057,829, filed on Sep. 30, 2014.

(51) Int. Cl.
*H04B 7/0452* (2017.01)
*H04W 4/06* (2009.01)
*H04W 74/00* (2009.01)
*H04L 5/00* (2006.01)
*H04W 84/12* (2009.01)

(52) U.S. Cl.
CPC ....... *H04W 72/005* (2013.01); *H04W 74/004* (2013.01); *H04W 74/006* (2013.01); *H04L 5/0023* (2013.01); *H04W 84/12* (2013.01)

(56) References Cited

OTHER PUBLICATIONS

"Part 11: Wireless LAN Medium Access Control (MAC) and Physical Layer (PHY) Specifications", IEEE Standards 802.11™—2012 (Revision of IEEE Standard 802.11-2007), Mar. 29, 2012, pp. 1-2695, IEEE (The Institute of Electrical and Electronic Engineers, Inc.), New York, NY, USA.

"Part 11: Wireless LAN Medium Access Control (MAC) and Physical Layer (PHY) Specifications, Amendment 4: Enhancements for Very High Throughput for Operation in Bands below 6 GHz", IEEE Standards 802.11ac™—2013, 2013, pp. 1-395, IEEE (The Institute of Electrical and Electronic Engineers, Inc.), New York, NY, USA.

"Part 11: Wireless LAN Medium Access Control (MAC) and Physical Layer (PHY) Specifications, Amendment 2: Sub 1 GHz License Exempt Operation", IEEE P802.11ah™/D5.0, Mar. 2015, pp. 1-604, IEEE (Institute of Electrical and Electronic Engineers, Inc.), New York, NY, USA.

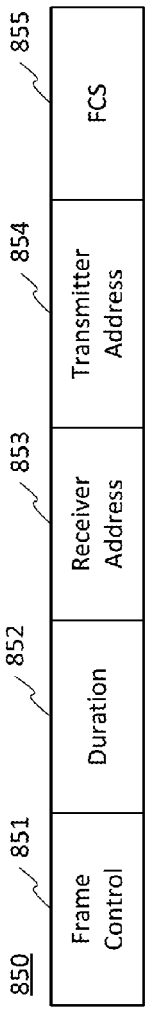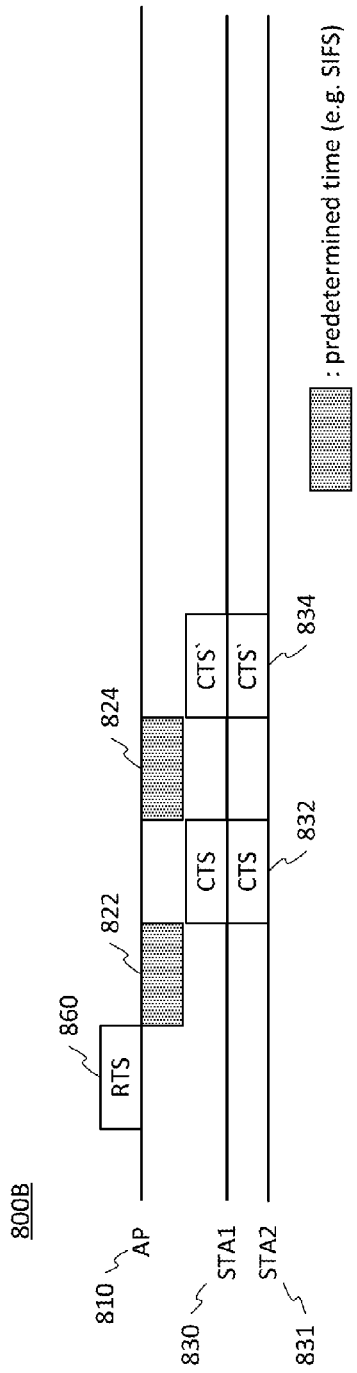

SYSTEMS AND METHODS FOR MULTI-USER SIMULTANEOUS TRANSMISSIONS

CROSS-REFERENCE TO RELATED APPLICATIONS

This application is a continuation of U.S. patent application Ser. No. 14/827,224, filed on Aug. 14, 2015, now U.S. Pat. No. 9,408,184, issued Aug. 2, 2016, which is a continuation of International Application No. PCT/US15/43502, filed on Aug. 3, 2015, which claims the benefit of U.S. Provisional Application No. 62/032,447, filed Aug. 1, 2014, and U.S. Provisional Application No. 62/057,829, filed Sep. 30, 2014, which are hereby incorporated by reference in their entirety.

FIELD OF THE INVENTION

The present disclosure provides communication techniques for use in Orthogonal Frequency Division Multiple Access (OFDMA) and multiple user multiple-input and multiple-output (MU-MIMO) type multi-user simultaneous transmission technologies and with applicability to other wireless multi-user simultaneous transmission technologies.

BACKGROUND

Today, wireless local area networks (WLANs) are widely used for communications between various computer devices and for Internet access. A prominent WLAN technology is known as WiFi, which allows electronic devices to network mainly using the 2.4 and 5 gigahertz bands. The term WiFi refers to any WLAN product that is based on the Institute of Electrical and Electronics Engineers (IEEE) 802.11 standards.

In 1999, IEEE 802.11a and 802.11b standards were released for WiFi networks. The 802.11a protocol can support data transmissions of up to 54 Mbps, whereas the 802.11b protocol has a longer range than 802.11a but maxes out at a data transmission speed of 11 Mbps.

In 2003, IEEE introduced 802.11g as a new WiFi standard. The 802.11g protocol was designed to operate at a maximum transfer rate of 54 Mbps while allowing for longer range connectivity.

Subsequently, the adoption of 802.11n by IEEE, sometimes called Wireless-N, brought about the ability to transfer data up to 300 Mbps and incorporated multiple wireless signals and antennas to support multiple-input and multiple-output (MIMO) technology. The 802.11n protocol allows data to be transmitted on both 2.4 GHz and 5 GHz frequencies.

The latest WiFi technology from IEEE, i.e. the 802.11ac standard, introduced advancements in dual-band technology, which allows data to be transmitted across multiple signals and bandwidths for maximum transmission rates of 1300 Mbps with extended ranges and nearly uninterrupted transmission.

As WiFi technology continues to advance, multi-user simultaneous transmission techniques, such as Orthogonal Frequency Division Multiple Access (OFDMA) and Uplink (UL) Multi-User MIMO (MU-MIMO), are candidates for improving wireless network efficiency. Using these techniques, multiple stations (STA) can be allocated within a frame, which requires communication of resource allocation and packet information by an access point (AP) for use by each STA.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure is directed to systems and methods for multi-user simultaneous transmissions.

In one aspect of the present disclosure, systems, methods, and devices are provided for protecting a multiuser (MU) transmission between an access point and a plurality of wireless stations. In one embodiment, the access point may transmit a frame (e.g., a trigger or request-to-send (RTS) frame) that is addressed to multiple stations in a wireless network. Each of the stations addressed by the frame may respond with an identical clear-to-send frame. In some embodiments, the clear-to-send frames transmitted by each wireless station may utilize the same scrambling code utilized by the frame transmitted by the access point, use the same modulation and coding scheme, and/or occupy the same frequency bands such that the multiple clear-to-send frames are combined in the air and detected as a single frame by the access point. In some embodiments, the access point may thereafter transmit an uplink reference frame to trigger the wireless stations to transmit an uplink data request frame to the access point. The uplink data request frame may indicate that the corresponding wireless station has data frames to transmit to the access point.

The aforementioned aspect of the present disclosure and other aspects are substantially shown in and/or are described in connection with at least one of the figures, as set forth more completely in the claims. The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

FIG. 8A illustrates a Request-to-Send (RTS) frame, according to 802.11 standards;

FIG. 8B illustrates an RTS frame, according to one implementation of the present disclosure;

FIG. 8D illustrates a data sequence diagram for the fifth protected multi-user simultaneous transmission scheme in a WLAN having a plurality of stations and an access point according to one implementation of the present disclosure.

DETAILED DESCRIPTION

Figure 1:
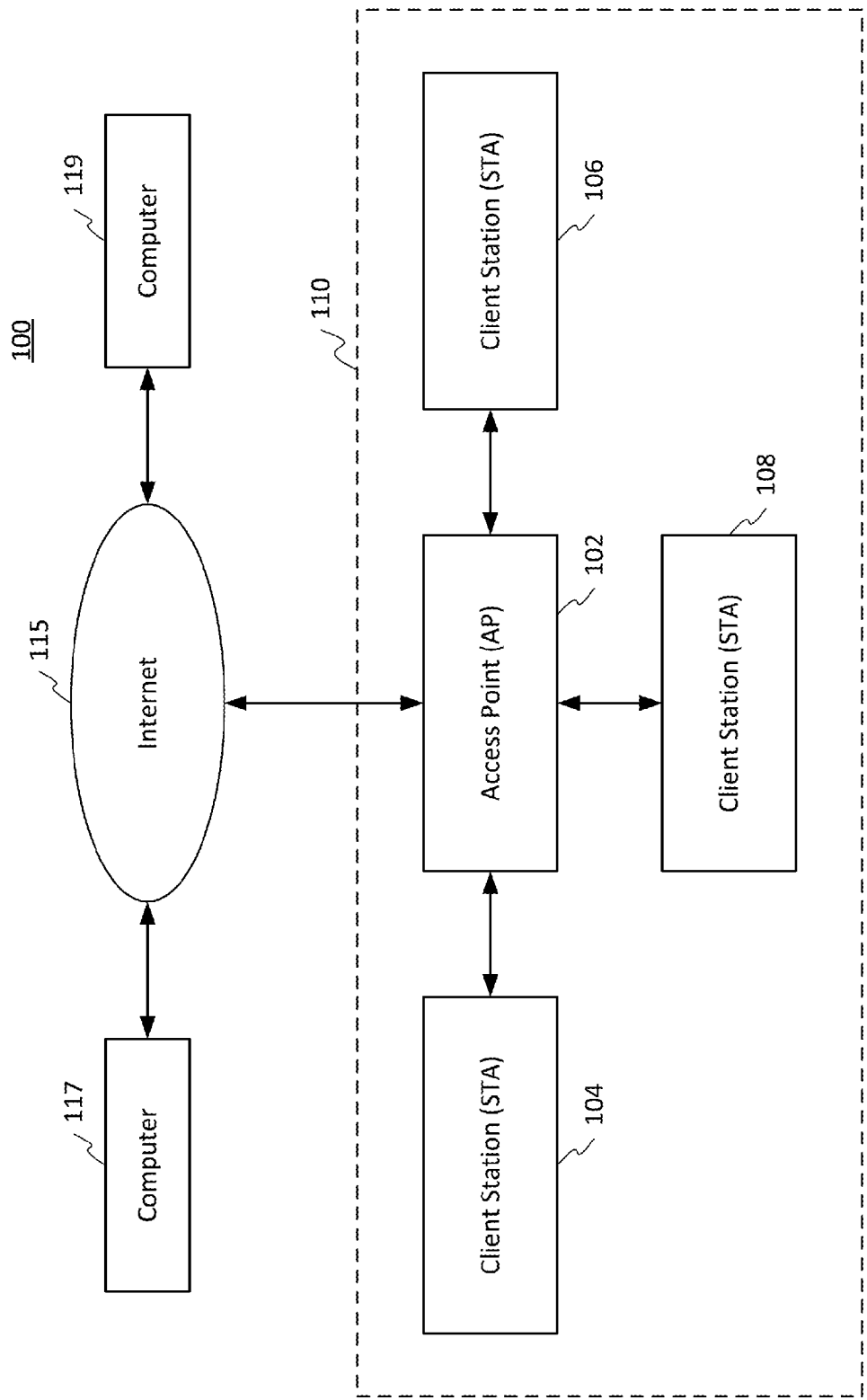
FIG. 1 illustrates a network including a wireless local area network (WLAN) having a plurality of stations in wireless communication with an access point according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates network 100 including wireless local area network (WLAN) 110 having a plurality of stations (STA) 104/106/108 in wireless communication with access point (AP) 102. Each of the STAs 104/106/108 and the AP 102 may be collectively referred to as WLAN devices or individually as a WLAN device. As shown in FIG. 1, AP 102 is also in communication with computers 117/119 over Internet 115. However, in other embodiments, the computers 117/119 may be in communication with WLAN devices 102/104/106/108 in the WLAN 110 via any other type of local area network, wide area network, metropolitan area network, etc.

WLAN 110 may be a WiFi network, which is established using any of the IEEE 802.11 standards. In FIG. 1, each STA 104/106/108 is wirelessly connected to AP 102 and communicates with AP 102 using any the IEEE 802.11 protocol and one or more of the techniques described herein. Similarly, AP 102 may communicate wirelessly with other STAs 104/106/108 in WLAN 110 using any of the IEEE 802.11 protocol and one or more of the techniques described herein. AP 102 is also connected to Internet 115 either through a wired connection (e.g., as a digital subscriber line (DSL) or a cable connection) and/or through a wireless connection (e.g., a cellular data network). As such, each STA 104/106/108 may also communicate with computers 117/119 over Internet 115 through AP 102.

Figure 2:
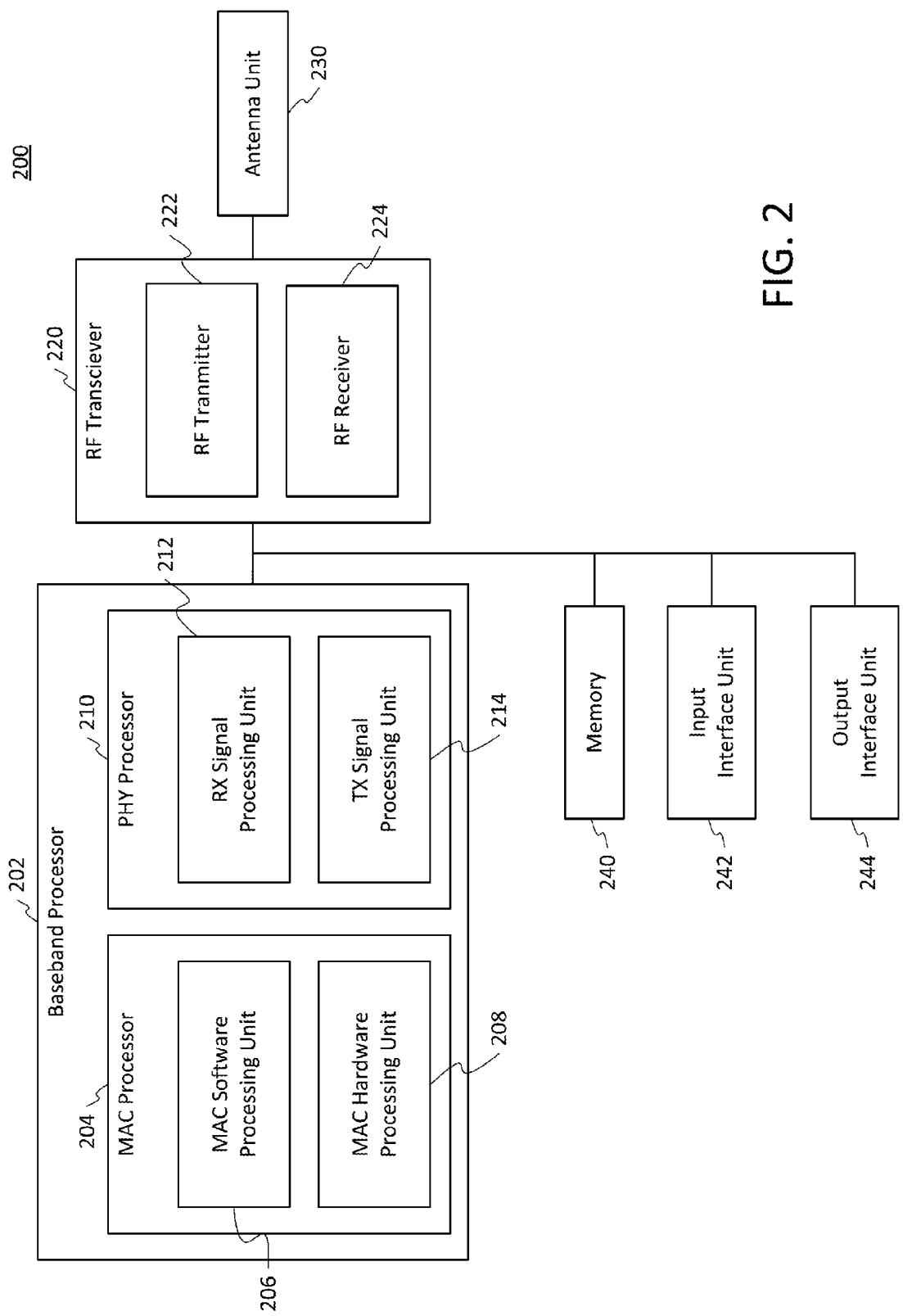
FIG. 2 presents components of a WLAN device for use in the WLAN of FIG. 1 according to one implementation of the present disclosure.

FIG. 2 presents components of WLAN device 200, which may be any of AP 102 and STA 104/106/108, for use in WLAN 110 of FIG. 1. WLAN device 200 is merely exemplary and AP 102 and STA 104/106/108 may include more, less, or different components than those shown and described. WLAN device 200 may include a medium access control (MAC) layer and a physical (PHY) layer, according to one or more IEEE 802.11 standards and one or more of the techniques described herein. In one implementation, as shown in FIG. 1, at least one WLAN device may operate as an access point device, such as AP 102, and other WLAN devices may be non-AP stations, such as STAs 104/106/108. In other implementations, not shown in FIG. 1, all WLAN devices may be non-AP STAs in an ad-hoc networking system. In general, AP STAs and non-AP STAs may be collectively referred to as a station.

With reference to FIG. 2, WLAN device 200 includes baseband processor 202, radio frequency (RF) transceiver 220, antenna unit 230, memory 240, input interface unit 242, and output interface unit 244. Baseband processor 202 performs baseband signal processing and may include MAC processor 204 and PHY processor 210.

In one implementation, MAC processor 204 may include MAC software processing unit 206 and MAC hardware processing unit 208. Memory 240 is a non-transitory storage device and may store software, such as MAC software, including at least some functions of a MAC layer implemented according to one or more techniques described herein. Memory 240 may further store an operating system and other software and applications for WLAN device 200. MAC software processing unit 206 executes the MAC software to implement various functions of the MAC layer and MAC hardware processing unit 208 may implement other functions of the MAC layer in hardware.

In one implementation, PHY processor 210 includes receive (RX) signal processing unit 212, which is connected to RF receiver 224, and transmit (TX) signal processing unit 214, which is connected to RF transmitter 222. TX signal processing unit 214 may include an encoder, an interleaver, a mapper, an inverse Fourier transformer (IFT), and a guard interval (GI) inserter. In operation, the encoder encodes input data, the interleaver interleaves the bits of each stream output from the encoder to change the order of bits, the mapper maps the sequence of bits output from the interleaver to constellation points, the IFT converts a block of the constellation points output from the mapper to a time domain block (i.e., a symbol) by using an inverse discrete Fourier transform (IDFT) or an inverse fast Fourier transform (IFFT), and the GI inserter prepends a GI to the symbol for transmission using RF transmitter 222 of RF transceiver 220. When multiple-input and multiple-output (MIMO) or multi-user (MU) MIMO (MU-MIMO) is used, RF transmitter 222 and the GI inserter may be provided for each transmit chain, in addition to one or more other portions of TX signal processing unit 214.

RX signal processing unit 212 may include a decoder, a deinterleaver, a demapper, a Fourier transformer (FT), and a GI remover. In operation, the GI remover receives symbols from RX receiver 224 of RF transceiver 220. When MIMO or MU-MIMO is used, RF receiver 224 and the GI remover may be provided for each receive chain, in addition to one or more other portions of RX signal processing unit 212. The FT converts the symbol (i.e., the time domain block) into a block of the constellation points by using a discrete Fourier transform (DFT) or a fast Fourier transform (FFT). The demapper demaps the constellation points output from the FT, the deinterleaver deinterleaves the bits of each stream output from the demapper, and the decoder decodes the streams output from the deinterleaver to generate input data for framing.

In one implementation, input interface unit 242 is configured to receive information from a user, and output interface unit 244 is configured to output information to the user. Antenna unit 230 may include one or more antennas for wireless transmission and reception of wireless signals. For example, for MIMO or MU-MIMO, antenna unit 230 may include a plurality of antennas.

As described above, each of AP 102 and/or STAs 104/106/108 may include one or more of the components shown in relation to WLAN device 200. Further, each of the components shown and the functionality described above in relation to WLAN device 200 may be implemented using software and/or hardware elements (e.g., circuits, memory units, state machines, etc.).

Figure 3:
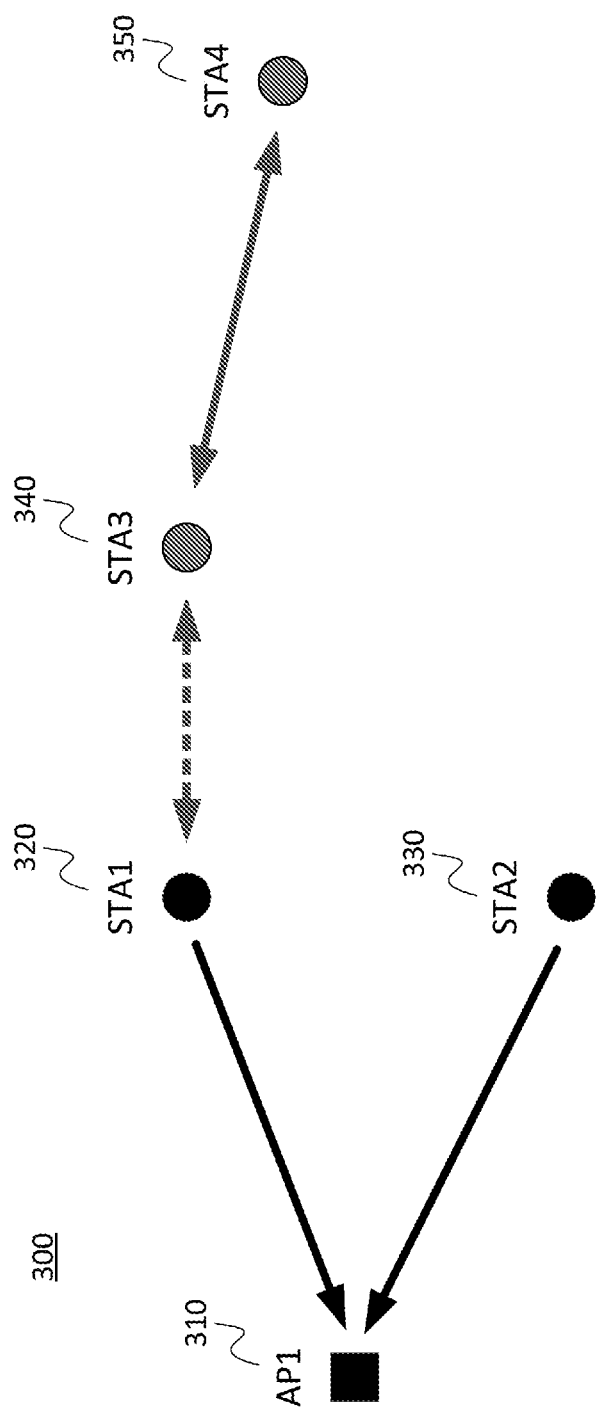
FIG. 3 illustrates a WLAN having a plurality of stations and an access point in multi-user simultaneous communications according to one implementation of the present disclosure.

Turning to FIG. 3, WLAN 300 is shown having a plurality of stations (STA1, STA2, STA3, STA4) 320/330/340/350 and access point (AP1) 310 in multi-user simultaneous communications. As there are multiple transmission points in multi-user (MU) simultaneous transmissions, a challenge arises for protecting the transmission duration before/during occurance of an actual transmission. MU simultaneous transmission means that two or more of STA1, STA2, STA3, STA4 320/330/340/350 are transmitting or receiving at the same time on a shared wireless medium according to scheduled resources assigned by AP1 310. Existing protection mechanisms are not capable of protecting the transmission duration in MU simultaneous transmissions, because existing protection mechanisms are either for point-to-point transmissions or designed from the perspective of transmission points only, which is not acceptable solutions for multi-user simultaneous communications. For example, in point-to-point transmissions, a transmitting station may send a Request-to-Send (RTS) frame requesting clearance for transmitting data and a receiving station may respond by sending a Clear-to-Send (CTS) frame to provide clearance for the transmission. However, this simple approach does not address the current challenge for protecting the transmission duration on the shared wireless medium in multi-user simultaneous communications where multiple stations may need to provide clearance.

With reference to FIG. 3, the current challenge for protecting the transmission duration in multi-user simultaneous communications may be illustrated, where AP1 schedules an uplink (UL) simultaneous transmission from STA1 320 and STA2 330. In this example, STA4 350 is far away from STA1 320, such that STA4 350 may consider the wireless communication channel to be idle when STA1 320 is transmitting data frames to AP1 310. Therefore, while STA1 320 is transmitting data frames to AP1 310, STA4 350 may initiate data delivery to STA3 340. Since STA1 320 and STA3 340 are close together, STA1's 320 data transmission to AP1 310 may interfere with STA3's 340 data reception from STA4 350, which may result in data reception failures. Even more, if STA3 340 transmits an acknowledgement frame to STA4 350 in response to STA4's 350 data transmission to STA3 340 and also AP1 310 transmits an acknowledgement frame to STA1 320 in response to STA1's 320 data transmission to AP1 310, these two acknowledgement frames may interfere with each other and result in a collision.

Another challenge for UL multi-user simultaneous transmission is UL scheduling, where UL transmissions must be pre-scheduled and synchronized. As such, AP1 310 has to know the UL buffered unit (BU) status and related information to properly schedule multiple STAs. Therefore, unless UL transmissions continue using piggy-backing mechanisms, such as using more data bit indications in preceding data frames, each STA needs to send a separate UL data indication, which requires additional overhead for UL MU transmissions. In existing protection mechanisms, the basic assumption is that AP1 310 already knows each STA's 320/330/340/350 UL buffered BU information and AP1 310 initiates the protection for UL data transmissions.

Figure 4A:
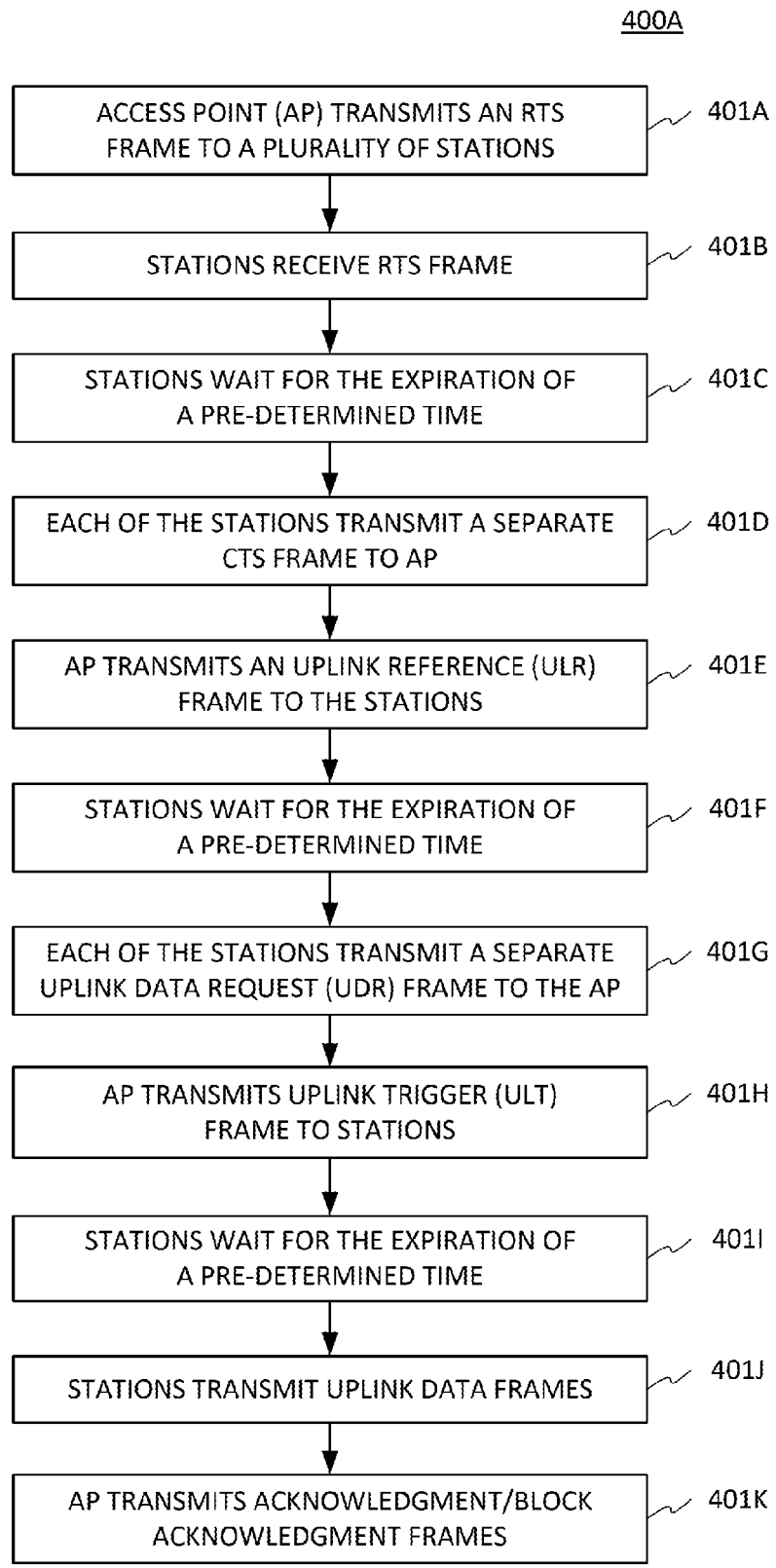
FIG. 4A illustrates a method for performing a first protected multi-user simultaneous transmission scheme in a WLAN having a plurality of stations and an access point according to one implementation of the present disclosure.
Figure 4B:
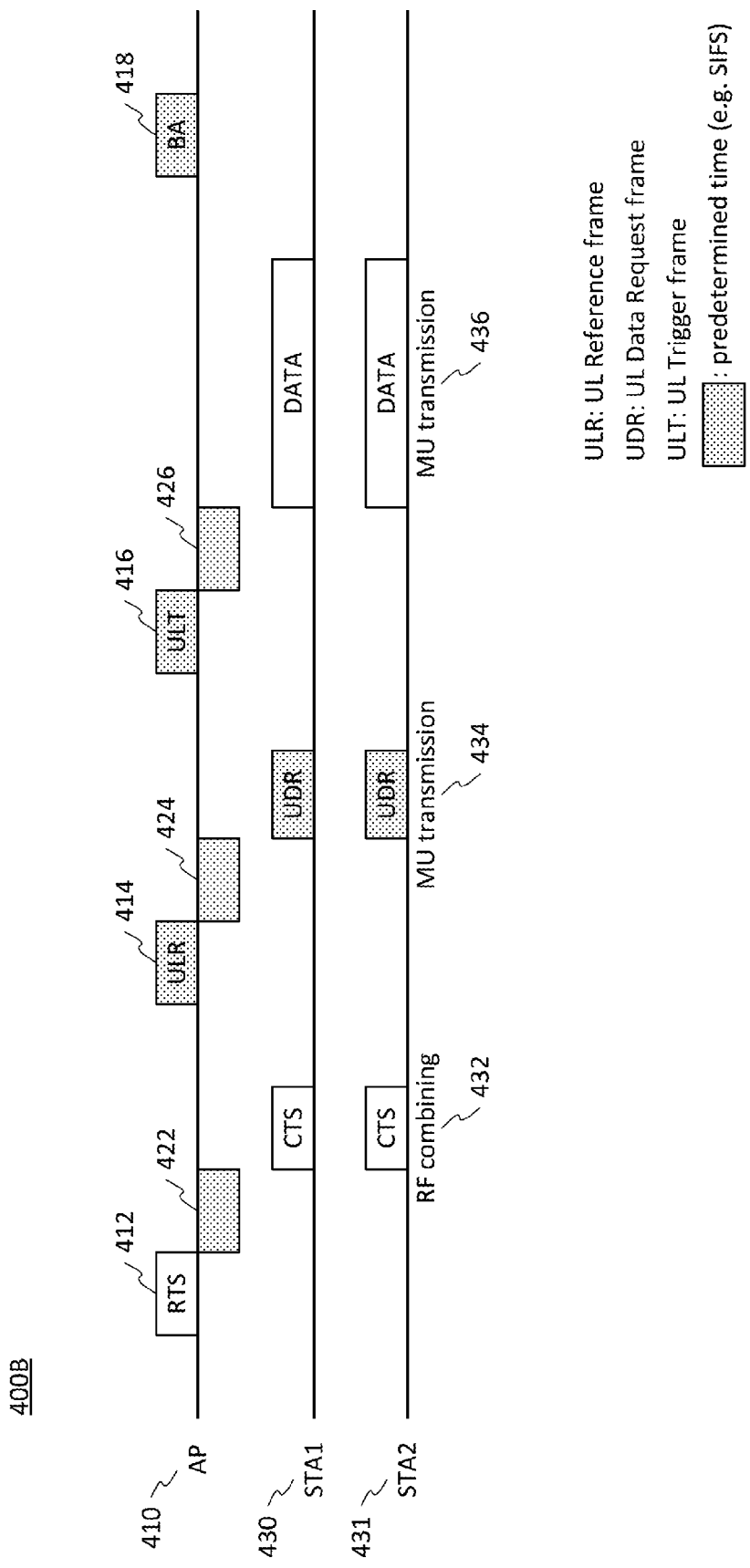
FIG. 4B illustrates a data sequence diagram for the first protected multi-user simultaneous transmission scheme according to one implementation of the present disclosure.

FIG. 4A and FIG. 4B illustrate a first protected multi-user simultaneous transmission scheme in a WLAN having a plurality of stations, including STA1 430 and STA2 431 and access point (AP) 410, according to one implementation of the present disclosure. In particular, FIG. 4A shows a method 400A and FIG. 4B shows a data sequence diagram 400B according to one embodiment. As will be described in greater detail below, the first protected multi-user simultaneous transmission scheme shown in FIG. 4A and FIG. 4B can schedule and protect a shared wireless medium for a duration of data transmissions in a multi-user simultaneous transmission system.

In one embodiment, the WLAN described herein, which includes STA1 430, STA2 431, and AP 410, may be similar to WLAN 110. In particular, STA1 430 and STA2 may be associated with AP 410 via a shared wireless medium such that STA1 430 and STA2 431 may transmit and receive data and control frames to/from AP 410. Although shown and described in relation to two stations (e.g., STA1 430 and STA2 431), in other embodiments the method 400A may be performed and the sequence diagram 400B may be adjusted in relation to more than two stations in a similar manner as described below.

In one implementation, the method 400A may commence at operation 401A with the transmission by AP 410 of a single Request-to-Send (RTS) frame 412 to a plurality of stations, including STA1 430 and STA2 431 as shown in the sequence diagram 400B. In one implementation, RTS frame 412 includes a Receiver Address (RA) representing a group of stations that are associated with AP 410. Upon receiving RTS frame 412 at operation 401B, each of the plurality of stations included in the RA of RTS frame 412, including STA1 430 and STA2 431, waits for an expiration of a pre-determined time 422, such as Short Interframe Space (SIFS) at operation 401C. SIFS may represent the amount of time in microseconds allowed for a wireless interface to process a received frame and respond with a response frame.

Upon expiration of pre-determined amount of time 422 (e.g., SIFS) and in response to receiving RTS frame 412, each of the plurality of stations included in the RA of RTS frame 412, including STA1 430 and STA2 431, unless the station is not allowed to contend the wireless medium, transmits a Clear-to-Send (CTS) frame 432 to AP 410 at operation 401D. For example, a station may not be allowed to contend for the wireless medium when the station has a non-zero Network Allocation Vector (NAV) value. In one embodiment, each of the plurality of stations included in the RA of RTS frame 412, including STA1 430 and STA2 431, use a predetermined rule for selecting modulation and coding scheme/set (MCS) level such that the plurality of stations included in the RA of RTS frame 412, including STA1 430 and STA2 431, use the same MCS level.

Since each of the plurality of stations, including STA1 430 and STA2 431, waits for an expiration of a predetermined time 422 at operation 401C (e.g., SIFS) before transmitting CTS frame 432, the transmission of CTS frame 432 by all of the plurality of stations, including STA1 430 and STA2 431, occurs simultaneously or nearly simultaneously at operation 401D. Each of the plurality of stations included in the RA of RTS frame 412, including STA1 430 and STA2 431, may use information in RTS frame 412 for the payload of CTS frame 432 such that each of the plurality of stations, including STA1 430 and STA2 431, transmit identical CTS frames 432 (e.g., the header and payload will contain identical bit level information). In one implementation, in order for the bit-level data to be the same for all CTS frames 432 transmitted by each of the stations included in the RA of RTS frame 412, the scrambling code that is used by each station for generating the CTS frames 432 may be identical. In one embodiment, the scrambler seed used by each station to generate and transmit the CTS frames 432 at operation 401D may be the same scrambler seed as in RTS frame 412. In other embodiments, the scrambler seed used by each station to generate and transmit the CTS frames 432 at operation 401D may be predetermined during any other previous transmission or during configuration of the WLAN.

As a result of the simultaneous transmissions of CTS frames 432 by each of the plurality of stations, including STA1 430 and STA2 431, and using the information in RTS frame 412, CTS frames 432 from each of the stations will be RF-combined. In particular, since each of the CTS frames 432 includes the same data, the same MCS, the same frequency bands, and utilize the same scrambler seed, each CTS frame 432 transmitted by each of the plurality of stations, including STA1 430 and STA2 431, can be combined in the air and received/detected as a single CTS frame 432 by AP 410 and/or any other wireless devices. In one implementation, CTS frames 432 transmitted by each station may use a conventional CTS frame format, which is used in existing IEEE 802.11 standards.

In response to receiving an RF combined frame (i.e., the frame that was generated based on the simultaneous transmission of CTS frames 432 by each of a plurality of stations), AP 410 sends an Uplink Reference (ULR) frame 414 at operation 401E for gathering or obtaining UL data information from the plurality of stations that transmitted a CTS frame 432 and/or that were included in the RA of RTS frame 412. At this point, AP 410 may not be able to distinguish those of the plurality of stations that transmitted CTS frame 432 from those that did not transmit a CTS frame 432, since in one implementation CTS frame 432 does not include an indicator identifying the transmitting station (i.e., each CTS frame 432 is identical and accordingly does not include transmitter information) and all of the CTS frames 432 are RF combined and perceived by the AP 410 as a single frame.

After receiving ULR frame 414 by each of the plurality of stations, including STA1 430 and STA2 431 that may have transmitted CTS frames 432, one or more of such stations that have buffered data may send UL Data Request (UDR) frame 434 to AP 410 at operation 401G to indicate that such one or more stations have buffered data for transmission. For example, STA1 430 may transmit a UDR frame 434 indicating that it has a transmit buffer that is one kilobyte full while STA2 431 may transmit a separate UDR frame 434 indicating that it has a transmit buffer that is two kilobytes full. As shown in FIG. 4A and FIG. 4B, UDR frames 434 may be transmitted after each of the plurality stations waits at operation 401F for expiration of a pre-determined time 424 from the completion of receiving ULR frame 414, such as SIFS. Based on UDR frames 434 from a plurality of stations, AP 410 may identify UL data information from each of the plurality of stations, including STA1 430 and STA2 431, which had transmitted UDR frames 434. In one embodiment, based on this UL data information, AP 410 may schedule particular resource units (e.g., frequency bands) for each station for transmitting uplink communications from the stations (e.g., STA1 430 and STA2 431) to AP 410. For example, resource units may be assigned for particular stations to facilitate Orthogonal Frequency Division Multiple Access (OFDMA) transmissions. In one embodiment, AP 410 may transmit UL Trigger (ULT) frame 416 to a plurality of the stations at operation 401H. For example, in one embodiment, the ULT frame 416 may be transmitted/addressed to each of the stations that immediately prior transmitted a UDR frame 434 at operation 401G. The ULT frame 416 may facilitate simultaneous UL data transmissions by the plurality of stations, including STA1 430 and STA2 431, which had transmitted UDR frames 434. In one implementation, ULT frame 416 may be transmitted to initiate each scheduled station to send UL data frames and may also provide scheduling information for UL data frame transmissions (e.g., resource/band assignment in an OFDMA transmission). Further, ULT frame 416 may provide timing reference for UL MU transmissions for UL data frames.

After receiving ULT frame 416 by the plurality of stations, including STA1 430 and STA2 431, which had transmitted UDR frame 434, stations scheduled by AP 410 in the ULT frame 416 will send UL data 436 frames in a predetermined time on scheduled wireless resources at operation 401J. This simultaneous data transmission may be performed using OFDMA, UL MU-MIMO, or a combination of UL OFDMA and UL MU-MIMO. As shown, in FIG. 4A and FIG. 4B, UL data frames 436 may be transmitted after each of the plurality stations waits for expiration of a pre-determined time 426 at operation 401I from the completion of receiving ULT frame 416, such as SIFS. After receiving UL data frames 436, AP 410 may send back acknowledgement frame or frames 418 at operation 401K to each of the plurality of stations that has transmitted data frames to AP 410 for which these data transmission were successfully received. Acknowledgement frames 418 may be a regular Acknowledgement (ACK) frame, Block Acknowledgement (BA) frame, or any combination of ACK and BA frames.

As described above, ULR frame 414 may serve a number of purposes. For example, ULR frame 414 may be used to initiate each participating STA to send a corresponding UDR frame 434. ULR frame 414 may also provide a timing and frequency reference for UL MU transmission for UDR frames 434, such that every participating STA's UDR frame 434 will arrive at AP 410 at the same or at a similar time with the same frequency or limited frequency difference (i.e., with small (or tolerable) frequency offset). Moreover, in one implementation, ULR frame 414 may include scheduling information for UDR frame 434 transmission. In one implementation, scheduling information for UDR frame 434 transmission may be performed implicitly, such that no additional information is needed in ULR frame 414 for scheduling. For example, each station can identify its UDR frame 434 transmission resource based on the order in which a station's address appears in the group of addresses in RTS frame 412.

Further, UDR frame 434 may indicate information that is helpful for AP 410 to schedule UL MU transmission, which may include Queue Size of buffered BU, Traffic Class or QoS (quality of service) information of buffered BU, preferred MCS level for uplink transmission, preferred frequency band, etc. In one embodiment, UL data frames 436 may follow UDR frames 434 without the plurality of stations waiting to receive ULT frame 416.

ULT frame 416 may also have a number of purposes. In one implementation, ULT frame 416 may be used to initiate each scheduled station to send UL data frame(s) 436. ULT frame 416 may provide a timing and frequency reference for UL MU transmission for UL data frames 436. Also, in one implementation, ULT frame 416 may include scheduling information for UL data frame 436 transmission, where the scheduling information may include information regarding resource allocation, e.g. in frequency domain in case of OFDMA, for each scheduled station.

In one implementation, even though MU transmissions may be used for UDR frame 434 transmissions, UDR frame 434 transmissions may also be performed in a serial transmission fashion and when serial transmissions are used, transmission of a ULR frame 414 may not be needed.

In one implementation, after receiving UDR frames 434 from the plurality of stations, AP 410 may send acknowledgement frame(s) to the plurality of stations before sending ULT frame 416. The transmission of acknowledgement frame(s) can provide a more robust exchange of frames between AP 410 and the plurality of stations. In one implementation, after sending acknowledgement 418, AP 410 may send Contention-Free End (CF-End) frame to terminate current Transmission Opportunity (TXOP), which allows other stations to access the shared wireless channel.

Since AP 410 schedules the stations that had sent CTS frames 432 for UL MU transmission, hidden node problems may also be avoided for all participating stations as CTS frame 432 transmission may be widely disseminated throughout the network area. Further, since a parallel CTS frame 432 transmission is used, protocol overhead for exchanging RTS frame 412 and/or CTS frames 432 is not a significant overhead for MU transmission.

Figure 5A:
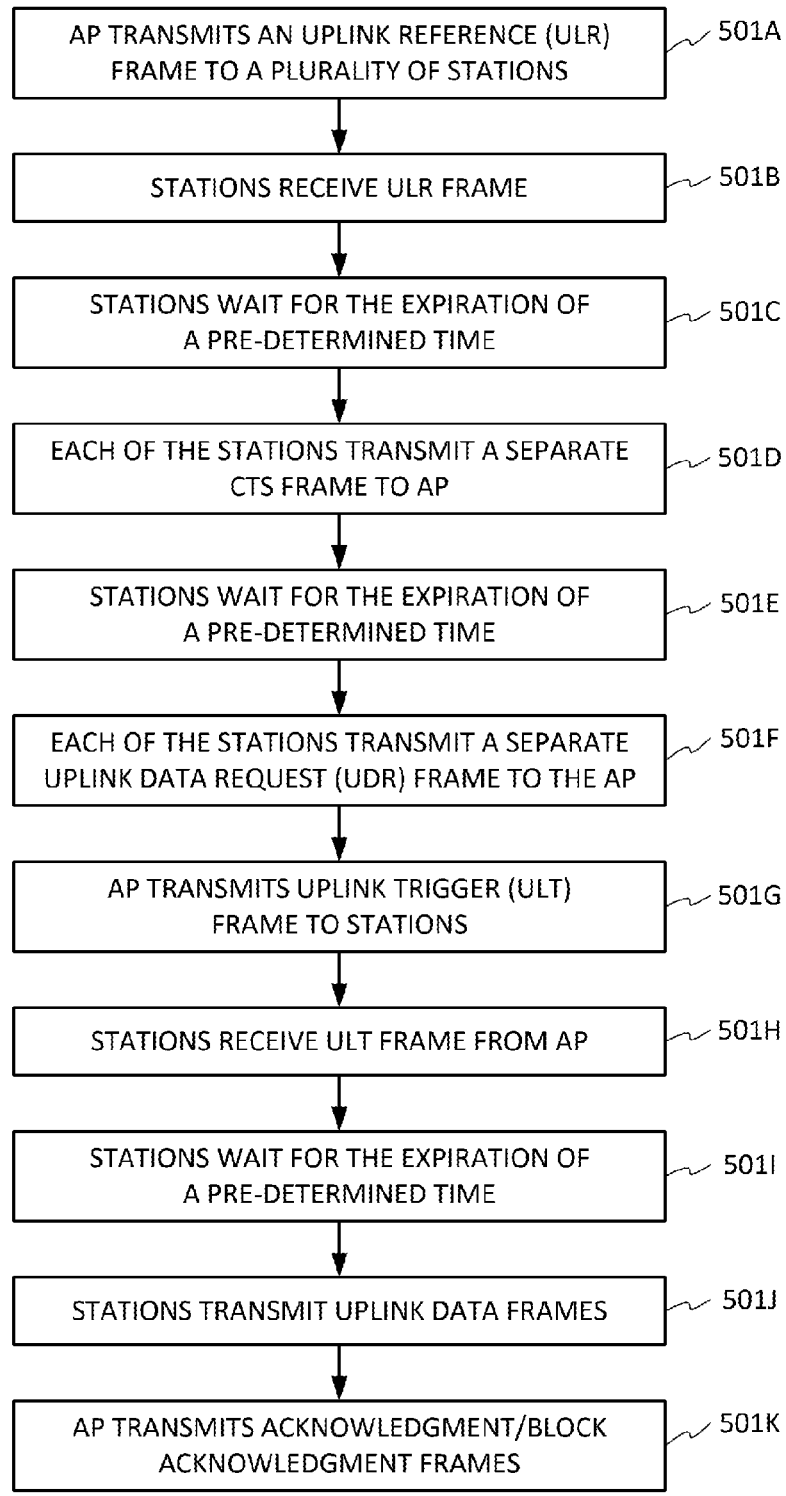
FIG. 5A illustrates a method for performing a second protected multi-user simultaneous transmission scheme in a WLAN having a plurality of stations and an access point according to one implementation of the present disclosure.
Figure 5B:
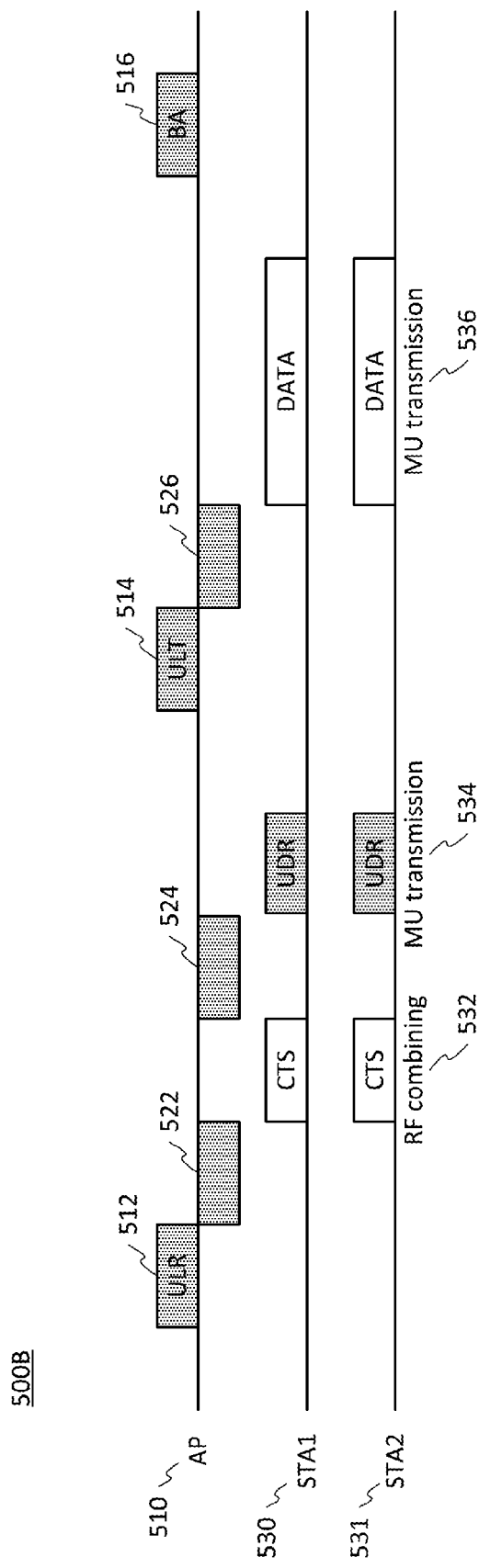
FIG. 5B illustrates a data sequence diagram for the second protected multi-user simultaneous transmission scheme according to one implementation of the present disclosure.

FIG. 5A and FIG. 5B illustrate a second protected multi-user simultaneous transmission scheme in a WLAN having a plurality of stations, including STA1 530 and STA2 531, and access point (AP) 510, according to one implementation of the present disclosure. In particular, FIG. 5A shows a method 500A and FIG. 5B shows a data sequence diagram 500B according to one embodiment.

In one implementation, AP 510 sends ULR frame 512 to an identified plurality of stations, including STA1 530 and STA2 531, and sets TXOP for the whole UL data delivery duration at operation 501A. Upon receiving ULR frame 512 at operation 501B, each station in the identified plurality of stations as indicated in ULR frame 512, waits at operation 501C for expiration of a pre-determined time 522, such as SIFS. Upon expiration of pre-determined amount of time 522 (e.g., SIFS), each station in the identified plurality of stations, including STA1 530 and STA2 531, as indicated in ULR frame 512 will respond by transmitting CTS frame 532 at operation 501D if each such station is allowed to access the wireless medium and has buffered BU for transmission. Similar to method 400A, the CTS frames 532 in method 500A may be identical, transmitted on the same frequency bands, and transmitted by each station at the same time or nearly the same time. Since the CTS frames 532 are transmitted at the same time and with the same bit level information on the same frequency bands, these CTS frames 532 may be RF combined such that AP 510 detects only a single combined frame. Accordingly, AP 510 will be unable to determine which station transmitted CTS frames 532.

Each of the plurality of stations transmitting CTS frames 532, may use information in ULR frame 512 for the payload of CTS frame 532, so that all of the plurality of stations will transmit identical CTS frames 532 (e.g., the header and payload will contain identical bit level information). In one implementation, in order for the bit-level data to be the same for all CTS frames 532 transmitted by each of the stations included/addressed in the ULR frame 512, the scrambler seed that is used by each station for generating the CTS frames 532 may be identical. In one embodiment, the scrambler seed used by each station to generate and transmit the CTS frames 532 at operation 501D may be the same scrambler seed as in ULR frame 512. In other embodiments, the scrambler seed used by each station to generate and transmit the CTS frames 532 at operation 501D may be predetermined during any other previous transmission or during configuration of the WLAN.

After transmitting CTS frames 532, each station in the identified plurality of stations, including STA1 530 and STA2 531, which have transmitted a CTS frame 532, waits for expiration of a pre-determined time 524, such as SIFS, at operation 501E. Upon expiration of the pre-determined amount of time 524 (e.g., SIFS), each station in the identified plurality of stations, including STA1 530 and STA2 531, which have transmitted CTS frame 532 will transmit UDR frame 534 at operation 501F.

Based on UDR frames 534, AP 510 may identify UL data information from multiple stations. This UL data information may be included in UDR frame 534 received from each station and may include Queue Size of buffered BU, Traffic Class or QoS (quality of service) information of buffered BU, preferred MCS level for uplink transmission, preferred frequency band, etc. AP 510 may schedule and send ULT frame 514 at operation 501G for simultaneous UL data frame 536 transmission by each station in the identified plurality of stations that has buffered data for transmission based on the extracted/determined UL data information. After receiving ULT frame 514 by each scheduled station at operation 501H, each of the scheduled stations may send UL data frame(s) 536 in a predetermined time on the scheduled wireless resource at operation 501J. This simultaneous transmission may be performed using an OFDMA scheme, a UL MU-MIMO scheme, or a scheme using a combination of UL OFDMA and UL MU-MIMO. In one embodiment, UL data frames 536 may be transmitted after each of the plurality stations waits at operation 501I for expiration of a pre-determined time 526 from the completion of receiving ULT frame 514, such as SIFS. After receiving UL data frame(s) 536 from each of the scheduled stations, AP 516 may send back Acknowledgement frame(s) 516 to each of the scheduled stations that has transmitted UL data frames 536 at operation 501K. The Acknowledgement frame 516 can be a regular Acknowledgement (ACK) frame, a Block Acknowledgement (BA) frame, and/or a combination of ACK and BA frames.

In one implementation, after receiving ULR frame 512, the identified plurality of stations, including STA1 530 and STA2 531, may send CTS frames 532 if the stations have buffered UL BU to send and the (virtual) channel is idle. Further, all such stations send a CTS frame 532 with identical payloads. As discussed in conjunction with FIG. 4A and FIG. 4B, UDR frames 534 may be sent simultaneously/parallel or in a serial manner. It should be noted that FIG. 5A and FIG. 5B illustrates a simultaneous transmission of UDR frames 534 only. In the embodiments that UDR frames 534 is transmitted in an MU transmission manner, UDR frames 534 from each station has to be sent at a predetermined time for synchronization, such that the plurality of stations transmit UDR frames 534 simultaneously.

To this end, the pre-determined amount of time 524 (e.g., SIFS) is utilized in FIG. 5A and FIG. 5B for synchronizing the transmission of UDR frames 534 by all stations. In one implementation, ULR frame 512 may have scheduling information for UDR 534 transmission.

In one implementation, AP 510 may use another mechanism to protect the whole duration, such as CTS-to-self or L-SIG protection. In one implementation, because CTS frame 532 transmission happens only from those of the plurality of stations that have buffered BU, the chance of sending CTS frames 532 by such plurality of stations that do not have any UL buffered BU is minimized.

Figure 6A:
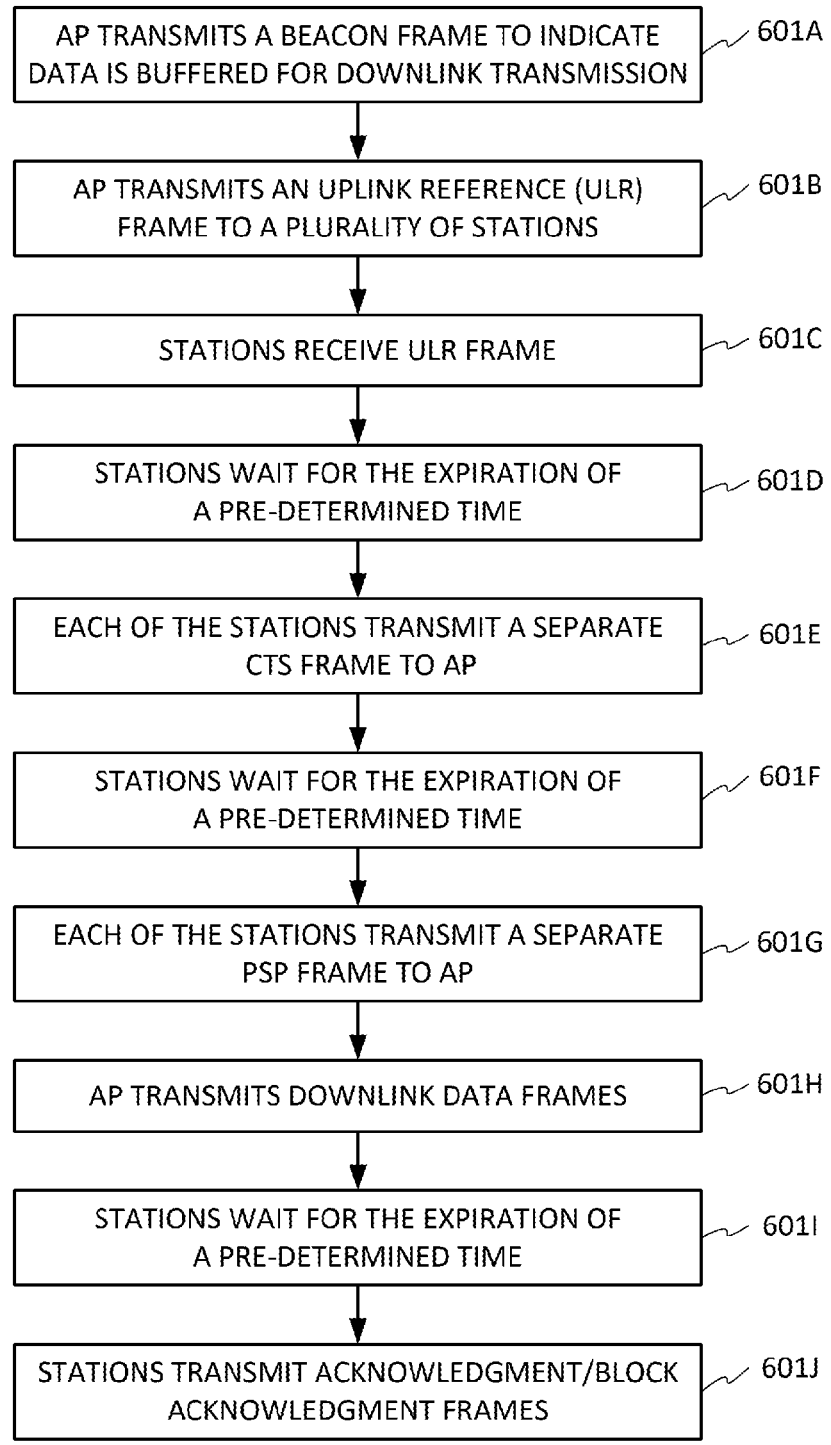
FIG. 6A illustrates a method for performing a third protected multi-user simultaneous transmission scheme in a WLAN having a plurality of stations and an access point according to one implementation of the present disclosure.
Figure 6B:
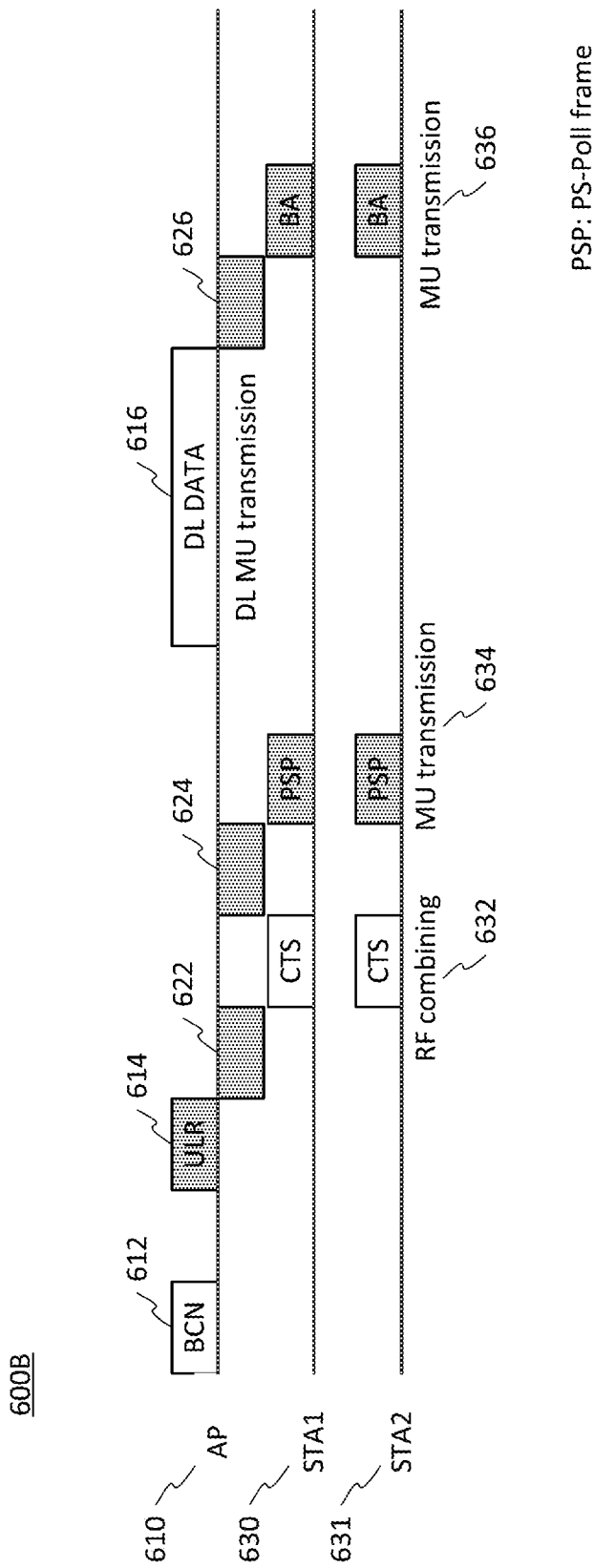
FIG. 6B illustrates a data sequence diagram for the third protected multi-user simultaneous transmission scheme according to one implementation of the present disclosure.

FIG. 6A and FIG. 6B illustrate a third protected multi-user simultaneous transmission scheme in a WLAN having a plurality of stations, including STA1 630 and STA2 631 and access point (AP) 610, according to one implementation of the present disclosure. In particular, FIG. 6A shows a method 600A and FIG. 6B shows a data sequence diagram 600B according to one embodiment.

The implementation of FIG. 6A and FIG. 6B illustrate a Downlink (DL) MU transmission, where AP 610 transmits data frames to the plurality of stations, including STA1 630 and STA2 631. In contrast to UL MU transmissions of FIGS. 4A, 4B, 5A, and 5B, where there are multiple transmitters, i.e. the plurality of stations, and a single receiver, i.e. a single AP, in DL MU transmissions of FIG. 6A and FIG. 6B, the plurality of stations, including STA1 630 and STA2 631, are the receivers and AP 610 is a single transmitter.

In one implementation, AP 610 indicates if DL BU is buffered for DL transmission to each of the plurality of stations, including STA1 630 and STA2 631, where the indication may be provided by Traffic Indication Map (TIM) information in Beacon frame 612 transmitted at operation 601A. As shown in FIG. 6B, AP 610 sends ULR frame 614 to an identified plurality of stations, including STA1 630 and STA2 631, and at the same time sets TXOP for the whole DL data delivery duration at operation 601B. Upon receiving ULR frame 614 at operation 601C, each station in the identified plurality of stations, including STA1 630 and STA2 631 as indicated in ULR frame 614, waits at operation 601D for expiration of a pre-determined time 622, such as SIFS. Upon expiration of pre-determined amount of time 622 (e.g., SIFS), each station in the identified plurality of stations, including STA1 630 and STA2 631 as indicated in ULR 614 will respond by transmitting a CTS frame 632 at operation 601E if each such station is allowed to access the wireless medium. In some instances, stations will respond with a CTS frame 632 at operation 601E when TIM bit in Beacon 612 for the station is set. Each of the identified plurality of stations, including STA1 630 and STA2 631, will transmit a CTS frame 632 simultaneously with identical payload information, as explained above, such that CTS 632 from the transmitting stations can be RF-combined.

As shown in FIG. 6A and FIG. 6B, after transmitting a CTS frame 632, each station in the identified plurality of stations, including STA1 630 and STA2 631, which have transmitted a CTS frame 632, waits at operation 601F for expiration of a pre-determined time 624, such as SIFS. Upon expiration of the pre-determined amount of time 624 (e.g., SIFS), each station in the identified plurality of stations, including STA1 630 and STA2 631, which have transmitted a CTS frame 632, will transmit a PS-Poll (PSP) 634 frame at operation 601G. Thereafter, AP 610 may transmit DL data frame(s) 616 at operation 601H to the identified plurality of stations, including STA1 630 and STA2 631, which have transmitted a CTS frame 632. In response to receiving DL data frames 616, each station in the identified plurality of stations, including STA1 630 and STA2 631, may send back an acknowledgement 636 frame or frames at operation 601J in either an MU manner (as shown in FIG. 6B) or a serial manner (not shown in FIG. 6B). In one embodiment, UL data frames 616 may be transmitted after each of the plurality stations waits at operation 601I for expiration of a pre-determined time 626 from the completion of receiving PSP frame 634, such as SIFS.

In one implementation, after receiving ULR frame 614 by the plurality of stations within the group indicated in ULR frame 614, each of the plurality of stations may send a CTS frame 632 if AP 610 has buffered BU to send for that station and the (virtual) channel is idle. In another implementation where ULR frame 614 is only sent to those stations within the group for which AP 610 has buffered BU, such stations may respond with CTS frame 632.

In one implementation, PSP frame 634 transmitted after CTS frame 632 by each of the plurality of stations may be transmitted in an MU manner (as shown in FIG. 6B) or in a serial manner (not shown). If PSP frame 634 is sent in an MU manner, PSP frame 634 has to be sent upon expiration of a predetermined time 624 for synchronization purposes. In one implementation, ULR frame 614 may have scheduling information for PSP frame 634 transmission. In one implementation, scheduling information for PSP frame 634 transmission may be determined/conveyed implicitly, such that no additional information is needed in ULR frame 614 for the scheduling. For example, each station can identify its PSP frame 634 transmission resource unit based on the order in which a station's identification appears in TIM bits in Beacon 612.

In one implementation, AP 610 may send acknowledgement frames (not shown) to the plurality of stations before sending DL data frames 616 to indicate successful reception of PSP frames 634 from the plurality of stations. Also, AP 610 may include any information that may also be included in ULR frame 614 in beacon frame 612, such that sending ULR frame 614 is unnecessary. In that case, each of the plurality of stations within the group will send CTS frames 632 after predetermined time 622 to AP 610 in response to receiving Beacon frame 612.

In one implementation, AP 610 may use another mechanism to protect the whole duration, such as CTS-to-self or L-SIG protection. In one implementation, since only those of the plurality of stations, which have already received Beacon frame 612 correctly with TIM bit set will send a CTS frame 632, transmissions to such plurality of stations should be protected by CTS frames 632.

Figure 7A:
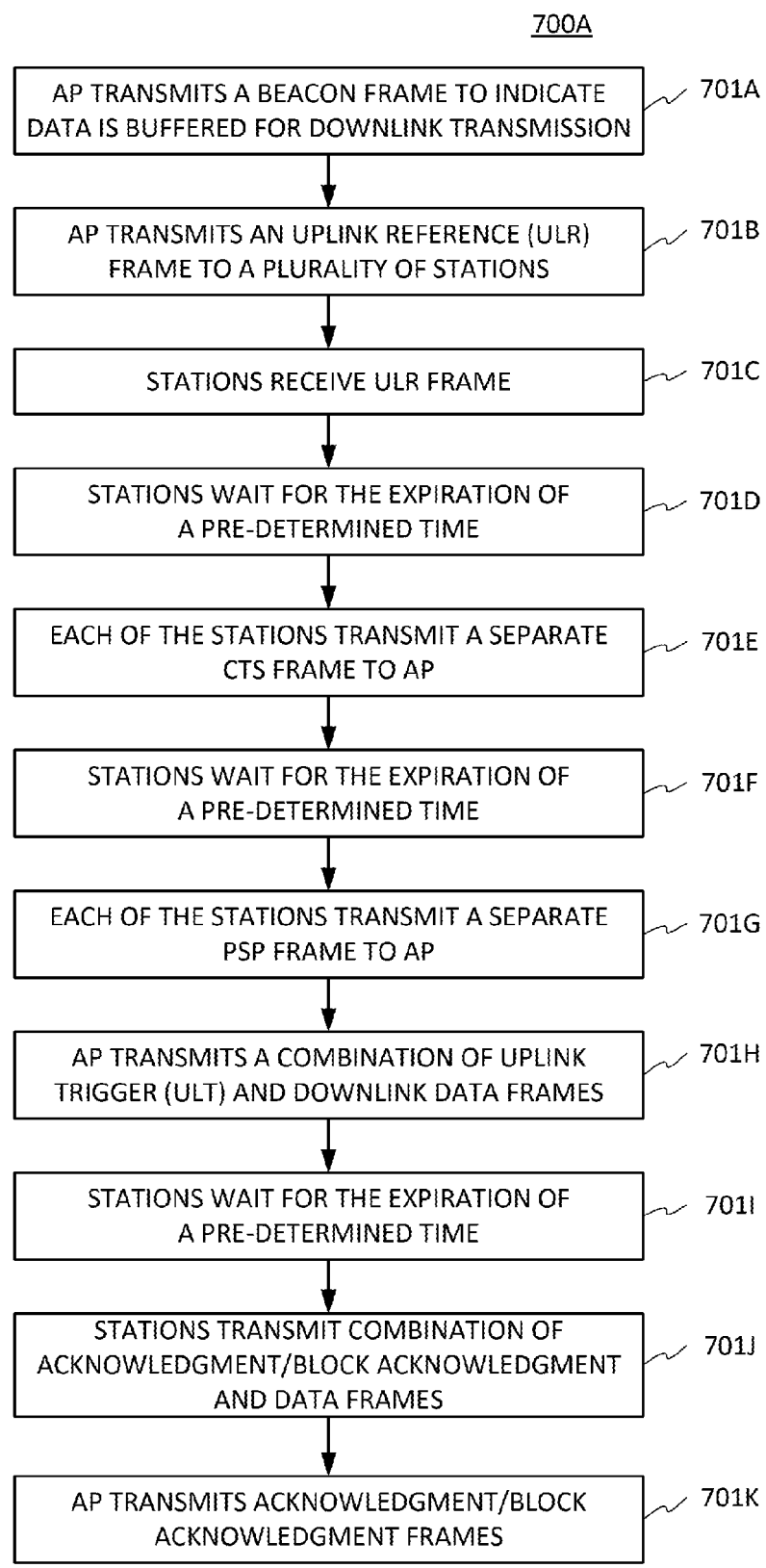
FIG. 7A illustrates a method for performing a fourth protected multi-user simultaneous transmission scheme in a WLAN having a plurality of stations and an access point according to one implementation of the present disclosure.
Figure 7B:
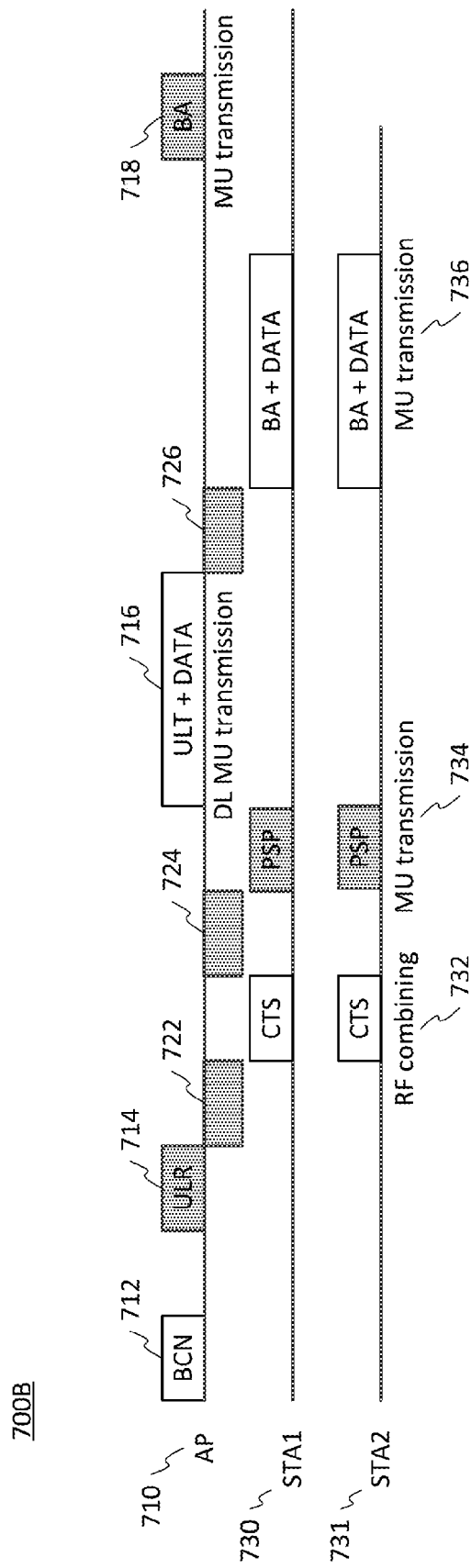
FIG. 7B illustrates a data sequence diagram for the fourth protected multi-user simultaneous transmission scheme according to one implementation of the present disclosure.

FIG. 7A and FIG. 7B illustrates a fourth protected multi-user simultaneous transmission scheme in a WLAN having a plurality of stations, including STA1 730 and STA2 731 and access point (AP) 710, according to one implementation of the present disclosure. In particular, FIG. 7A shows a method 700A and FIG. 7B shows a data sequence diagram 700B according to one embodiment. In one implementation, the fourth protected multi-user simultaneous transmission scheme may be utilized for cascading DL and UL transmissions within a TXOP duration as shown in FIG. 7B. As shown, AP 710 indicates if downlink BU is buffered for DL transmissions to each of the plurality of stations, including STA1 730 and STA2 731. In one implementation, the indication may be provided by TIM information in Beacon frame 712 that is transmitted to stations at operation 701A.

As shown in FIG. 7A and FIG. 7B, AP 710 sends ULR frame 714 to an identified plurality of stations, including STA1 730 and STA2 731, and at the same time sets TXOP for the whole DL and UL data delivery duration at operation 701B. Upon receiving ULR frame 714 at operation 701C, each station in the identified plurality of stations, including STA1 730 and STA2 731, as indicated in ULR 714, waits at operation 701D for expiration of a pre-determined time 722, such as SIFS. Upon expiration of pre-determined amount of time 722 (e.g., SIFS), each station in the identified plurality of stations, including STA1 730 and STA2 731, as indicated in ULR 714 will respond by transmitting a CTS frame 732 at operation 701E if each such a station is allowed to access the wireless medium. In some instances, stations will respond with a CTS frame 732 at operation 701E when either the AP 710 has buffered BU to send to the station or the station has buffered data to send. Each station in the identified plurality of stations, including STA1 730 and STA2 731, will transmit a CTS frame 732 simultaneously with identical payload and bit level information, as explained above, such that CTS frames 732 from the transmitting stations can be RF-combined over the air.

As shown in FIG. 7A and FIG. 7B, after transmitting a CTS frame 732, each station in the identified plurality of stations, including STA1 730 and STA2 731, which have transmitted a CTS frame 732, waits at operation 701F for the expiration of a pre-determined time 724, such as SIFS. Upon expiration of the pre-determined amount of time 724 (e.g., SIFS), each of the identified plurality of stations, including STA1 730 and STA2 731, which have transmitted a CTS frame 732, will transmit a UDR frame at operation 701G. In one implementation, a modified PS-Poll (PSP) frame 734 is sent as the UDR frame by some or all of the STAs. In this embodiment, PSP frame 734 indicates that (1) the transmitting station of the plurality of stations is in an active state, such that the transmitting station can receive DL buffered BU from AP 710 and/or (2) the transmitting station's UL buffered BU information to AP 710 (e.g., that the transmitting station has UL buffered data to send to AP 710). In one implementation, PSP frames 734 transmitted after CTS frames 732 by each of the plurality of stations may be transmitted in an MU manner (as shown in FIG. 7B) or in a serial manner (not shown). If PSP frame 734 are sent in the MU manner, PSP frames 734 has to be sent upon expiration of predetermined time 724 for synchronization purposes. In one implementation, ULR frame 714 may have scheduling information for PSP frame 734 transmission.

After receiving PSP frames 724, at operation 701H AP 710 transmits a combination of ULT scheduling information and DL data frame(s) 716 to the identified plurality of stations, including STA1 730 and STA2 731, which have transmitted a CTS frame 732. As shown in FIG. 7A and FIG. 7B, after receiving ULT and DL data frames 716, each of the plurality of stations, including STA1 730 and STA2 731, waits at operation 701I for expiration of a pre-determined time 726, such as SIFS. Upon expiration of the pre-determined amount of time 726 (e.g., SIFS), each of the plurality of stations, including STA1 730 and STA2 731, which have received ULT and/or DL data frames 716, may send back acknowledgement (e.g., ACK or BA) and/or UL data frames 736 at operation 701J in either an MU manner (as shown in FIG. 7B) or a serial manner (not shown in FIG. 7). Thereafter, at operation 701K AP 710 may send acknowledgement frames 718 (e.g., ACK or BA) to each of the plurality of stations transmitting UL data.

In one implementation, AP 710 may send acknowledgement frames (not shown) for received PSP frames 734 before sending ULT and DL data frames 716. Also, in one implementation, AP 710 may include information relating to ULR frames 714 within Beacon frame 712. In such an implementation, AP 710 will not need to transmit ULR frame 714 separate from and after Beacon frame 712 and upon expiration of pre-determined amount of time 722 (e.g., SIFS), each of the identified plurality of stations, including STA1 730 and STA2 731, as indicated in Beacon frame 712 will respond by transmitting a CTS frame 732.

In one implementation, AP 710 sends DL data frames and a ULT frame as consecutive and separate frames rather than as a combined ULT and DL data frame 716. In one implementation, after each of the plurality of stations receives ULR frame 714, any station identified within the group indicated in ULR frame 714 may send CTS frame 732 if (virtual) channel is idle and either AP 710 has buffered BU to send to the station or the station has buffered BU to send to AP 710. In one implementation, AP 710 may use another mechanism to protect the whole duration, such as CTS-to-self or L-SIG protection.

Turning to FIG. 8A, FIG. 8A illustrates Request-to-Send (RTS) frame 850, according to IEEE 802.11 standards. As shown, RTS frame 850 includes frame control 851, duration 852, receiver address (RA) 853, transmitter address (TA) 854, and frame check sequence (FCS) 855, as defined in legacy IEEE 802.11 standards. RA 853 indicates the MAC address of the station that shall receive frame 853 and TA 854 indicates the MAC address of the station which has transmitted frame 853.

FIG. 8B illustrates RTS frame 860, according to one implementation of the present disclosure. As shown, RTS frame 860 includes frame control 861, duration 862, receiver addresses (RAs) 863, transmitter address (TA) 864, and frame check sequence (FCS) 865. Frame control 861, duration 862, TA 864 and FCS 865 are similar to the corresponding fields in RTS frame 850, i.e. as defined in legacy IEEE 802.11 standards. However, RAs 863 can address multiple wireless stations at the same time, as opposed to RA 853, which can include a single receiver address.

In one implementation, RAs 863 in RTS 860 frame may be (a) the MAC address of an STA, or (b) an indication of several STAs with specific coding. The specific coding may be a combination of the IEEE 802.11ac-defined group ID (GID), a set of GIDs, or combination of a GIDs with the MAC addresses. The IEEE 802.11ac-defined GID may be 6-bits long. In general, since the RA field 863 has 6 byte length, 2^48 STAs can theoretically be identified. This type of identification while is possible, it is usually complex and operationally expensive. However, in one embodiment, capable devices might use such addressing.

In one implementation, RAs 863 in RTS frame 860 may be used to carry the IEEE 802.11ac-defined group identifier (GID) field. For instance, the GID may appear at the least significant bits (LSBs) of RAs 863 or in the most significant bits (MSBs) of RAs 863. In another implementation, the 6-bit GID may be repeated once in every octet of RAs 863, e.g. XXGID has two arbitrary bits indicated as X and the GID with 6 bits which totals 8 bits. This pattern may be repeated six times in RAs 863. Similarly, other repeated patterns may be used, such as XGIDX and GIDXX, or with various repetition patterns. The patterns reduce the likelihood that RAs 863 becomes the same as the MAC address of a STA. While there are a number of patterns that can be utilized. In one implementation, an AP may announce the pattern (e.g. during association time) such that the pattern becomes known to the stations.

In another implementation, RAs 863 might indicate several GIDs in order to address more stations. For instance, there might be GID1 and GID2 that appear once in RAs 863 or might appear twice, or at most three times. Similarly, three GIDs might appear in RAs 863 once or at most twice.

While there are a number of patterns that can be utilized, in one implementation, an AP may announce the pattern (e.g. during association time), such that the pattern becomes known to the stations.

Figure 8C:
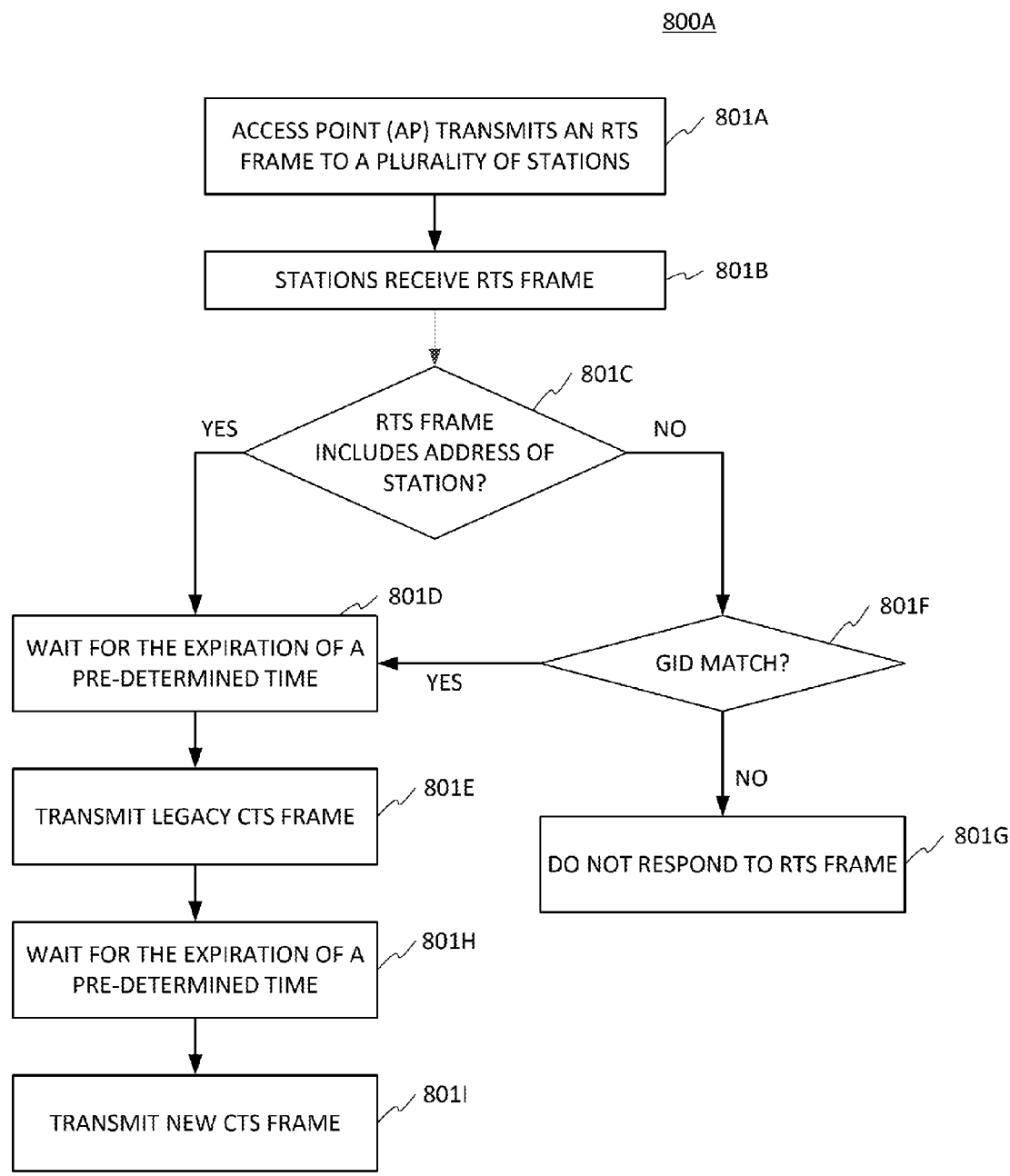
FIG. 8C illustrates a method for performing a fifth protected multi-user simultaneous transmission scheme in a WLAN having a plurality of stations and an access point according to one implementation of the present disclosure.

This multiple addressing RTS frame 860 may be used in one or more of the embodiments described herein. Namely, the multiple addressing RTS frame 860 may be used as RTS frame 412, ULR frame 512, ULR frame 614, and/or ULR frame 714. FIG. 8C and FIG. 8D illustrates a fifth protected multi-user simultaneous transmission scheme in a WLAN having a plurality of stations, including STA1 830 and STA2 831 and access point (AP) 810, according to one implementation of the present disclosure. In particular, FIG. 8C shows a method 800A and FIG. 8D shows a data sequence diagram 800B according to one embodiment. As shown in FIG. 8C and FIG. 8D, AP 810 sends a first protection frame, namely Request-to-Send (RTS) frame 860, which can include multiple receiver addresses for addressing multiple stations at the same time at operation 801A. In one embodiment, the RTS frame 860 may be similar or identical to RTS frame 860. The plurality of stations may include one or more legacy stations, i.e. stations that are designed for detecting and processing legacy RTS frame 850 only, e.g. STA1 830, and also may include one or more new stations, i.e. stations that are designed for detecting and processing legacy RTS frame 850 as well as new RTS frame 860, e.g. STA2 831.

When STA2 831 receives RTS frame 860 at operation 801B, STA2 831 determines at operation 801C whether RAs 863 includes the MAC address of STA2 831. If so, STA2 831 waits at operation 801D for expiration of a pre-determined time 822, such as SIFS, after receiving RTS frame 860, and then transmits CTS frame 832 to AP 810 at operation 801E, where CTS frame 832 is defined by legacy IEEE 802.11 standards.

If RAs 863 does not match the MAC address of STA2 831, STA2 831 compares the group identification(s) (GID (s)) that STA2 831 belongs to (with the known GID repetition pattern) to RAs 863 at operation 801F. If a match occurs, then STA2 831 waits at operation 801D for an expiration of a pre-determined time 822, such as SIFS, after receiving RTS frame 860 and then transmits CTS frame 832 at operation 801E to AP 810, where CTS frame 832 is defined by legacy IEEE 802.11 standards. In this case, multiple stations have been addressed by AP 810 and thus multiple stations would be sending legacy CTS frames 832 at the same time. It should be noted that the contents of legacy CTS frames 832 from each station are the same, since only the MAC address of the destination, which is that of AP 810, appears in the MAC header and not the transmitter address. In one implementation, in order for the bit-level data to be the same for all CTS frames 832, the scrambling code that is used by each station should be the same scrambling code as in RTS frame 860 or any fixed scrambling code.

When STA1 830 receives RTS frame 860, STA1 830 determines whether RAs 863 match the MAC address of STA1 830. Since RAs 863 is not defined similar to RA 853, STA1 830 would not able to match the MAC address of STA1 830 with RAs 863. In this situation, STA1 830 may attempt to compare the RA's 863 with GIDs STA 830 belongs to at operation 801F or simply not response to the received RTS frame at operation 801G.

In one implementation, when AP 810 transmits RTS frame 860 to a plurality of stations, the plurality of stations that are designed for detecting and processing legacy RTS frame 850 as well as new RTS frame 860, e.g. STA2 831, respond with CTS frame 832 and multiple CTS frames 832 from two or more stations get RF-combined over the air. The RF combined CTS frame 832 is received by AP 810 and AP 810 determines that some of the intended stations have responded with CTS frame 832. However, AP 810 cannot determine which ones of the intended stations have responded with CTS frame 832 as no transmission identifier is included in the individual or combined CTS frames 832. Further, the unintended station(s) of the plurality of stations would receive RTS frame 860 and CTS frame(s) 832 and defer properly as defined in the legacy 802.11 standard.

In one implementation, STA2 831 (which is designed for detecting and processing legacy RTS frame 850 as well as new RTS frame 860) waits at operation 801H for the expiration of a pre-determined time 824, such as SIFS. After expiration of the predetermined time, STA2 831 sends a second CTS frame at operation 801I. Namely, STA2 831 sends CTS' frame 834 to AP 810 after sending CTS frame 832. However, CTS' frame 834 has a different PLCP protocol data unit (PPDU) format than CTS frame 832. For example, CTS' frame 834 has a PPDU format using orthogonal codes where when multiple frames are sent by several stations, the frames get combined over the air. However, AP 810 is capable of decoding the combined frames and identify the individual content. This may be accomplished with an orthogonal coding having proper auto-correlation and cross-correlation properties and with sufficient time and frequency synchronization among the transmitting stations. As such, AP 810 can determine which of the intended stations have responded to RTS frame 860, for instance by using the decoding procedure for the orthogonal codes where a priori a specific orthogonal code is assigned to the associated stations or individually assigned to each station within a given GID (for instance, a fixed orthogonal code is assigned to the first/second/etc. stations within any GID). AP 810 may then properly form a DL multiuser frame, such as DL MU MIMO frame, or DL OFDMA frame. It should be noted that the unintended stations, whether stations similar to STA2 831 or legacy stations similar to STA1 830, which are in the neighborhood of one of the intended stations would see the RTS and CTS exchange as a legacy RTS/CTS followed by another frame and would defer properly.

In one implementation, AP 810 transmits a frame that is capable of identifying or addressing several STAs, such as a Trigger frame. In response, one or more of the STAs that receive and determine that they are addressed by AP 810 in the frame, respond to AP 810 by transmitting CTS frame 832. In this implementation, since AP 810 is unable to determine which stations provided a response (i.e., unable to determine which STAs sent CTS frame 832 as these CTS frames 832 do not include transmitting identifiers, stations may follow up by transmitting CTS' frames 834. AP 810 may determine which stations responded based on CTS' frames 834 based on implicit or explicit addressing within the CTS' frames 834. In one implementation, CTS' frame 834 may have a format according to UL OFDMA, such that the first frame (e.g., Trigger/RTS/ULR frame) may have details on allocation of sub-bands to each STA. In another implementation, CTS' frame 834 may have a format according to UL MU MIMO, such that the first frame (e.g., Trigger/RTS/ULR frame) has a P matrix sized to construct a set of long training field (LTF) symbols and an indication on allocation of a row of the P matrix to each STA.

In one implementation, AP 810 transmits a frame that is capable of identifying or addressing several STAs, such as a Trigger frame. In response, one or more of the STAs that receive and determine that they are addressed by AP 810 in the frame, respond to AP 810 by transmitting CTS' frames 834, without first transmitting CTS frame 832. In this implementation, AP 810 may determine which stations responded based on CTS' frames 834. In one implementation, CTS' frames 834 may have a format according to UL OFDMA, such that the first frame (e.g., Trigger/RTS/ULR frame) may have details on allocation of sub-bands to each STA. In another implementation, CTS' frame 834 may have a format according to UL MU MIMO, such that the first frame (e.g., Trigger/RTS/ULR frame) has a P matrix sized to construct a set of LTF symbols and an indication on allocation of a row of the P matrix to each STA.

It should be noted that in some implementations, AP 810 transmits a frame that is capable of identifying or addressing several STAs, such as a Trigger frame, which indicates a preference of a type of frame to be received from the STAs. For example, rather than CTS' frames 834, AP 810 may request other types of frames that indicate the power-save or buffer status of the STA to AP 810, e.g. PS-Poll frame, QoS Null frame, etc.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

As noted above, an embodiment of the invention may be an apparatus (e.g., an access point, a client station, or another network or computing device) that includes one or more hardware and software logic structure for performing one or more of the operations described herein. For example, the apparatus may include a memory unit, which stores instructions that may be executed by a hardware processor installed in the apparatus. The apparatus may also include one or more other hardware or software elements, including a network interface, a display device, etc.

As also noted above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

What is claimed is:

1. A wireless device operating in a wireless network, the wireless device comprising:
    a hardware processor; and
    one or more memory devices coupled to the hardware processor, wherein the one or more memory devices include one or more instructions, which when executed by the hardware processor cause the wireless device to:
    analyze a downlink frame received by the wireless device from an access point, wherein the downlink frame is addressed to multiple devices in the wireless network, including the wireless device, and wherein analyzing the downlink frame includes detecting that the downlink frame requests use of a wireless channel for a transmission by the access point,
    generate a first clear-to-send (CTS) frame for responding to the downlink frame, wherein the first CTS frame shares identical information with that of a second CTS frame transmitted from another device in the wireless network that is addressed by the downlink frame, wherein the first CTS frame is a response to the downlink frame and protects the wireless channel for use by the access point, and
    transmit the first CTS frame, in response to the downlink frame, to the access point, wherein the first CTS frame is transmitted according to implicit timing information provided by the downlink frame, and wherein the downlink frame provides the implicit timing information for the transmission of the second CTS frame by the another device in the wireless network.

2. The wireless device of claim 1, wherein generating the first CTS frame includes:
    scrambling, by the wireless device, one or more portions of the first CTS frame using a scrambling code, wherein the scrambling code is to be used to scramble the second CTS frame.

3. The wireless device of claim 2, wherein the scrambling code is determined based on the downlink frame.

4. The wireless device of claim 2, wherein the scrambling code is the same scrambling code as in the downlink frame.

5. The wireless device of claim 1, wherein the one or more memory devices include further instructions, which when executed by the hardware processor cause the wireless device to:
    analyze an address field of the downlink frame, wherein the address field includes one or more group identifiers associated with the multiple devices in the wireless network; and
    generate the first CTS frame in response to determining a match between an identifier in the one or more group identifiers and an identifier associated with the wireless device.

6. The wireless device of claim 5, wherein the address field is a Receiver Address (RA) field in a media-access control (MAC) header of the downlink frame.

7. The wireless device of claim 6, wherein the downlink frame is a Request-to-Send (RTS) frame.

8. The wireless device of claim 6, wherein the downlink frame includes scheduling information for a multi-user uplink transmission.

9. The wireless device of claim 1, wherein the downlink frame and the first CTS frame protect one or more multi-user transmissions during a transmission opportunity set by the downlink frame and the first CTS frame.

10. The wireless device of claim 1, wherein the first CTS frame is a non-high throughput frame.

11. A wireless device operating in a wireless network, the wireless device comprising:
    a hardware processor; and
    one or more memory circuits coupled to the hardware processor, wherein the one or more memory circuits include one or more instructions, which when executed by the hardware processor cause the wireless device to:
    generate a first downlink frame addressed to a set of stations in the wireless network, transmit the first downlink frame to the set of stations in the wireless network, wherein the first downlink frame requests use of a wireless channel for a transmission by the wireless device, receive an uplink Clear-to-Send (CTS) frame from a plurality of stations in the set of stations, wherein the uplink CTS frame is composed of a plurality of uplink transmissions that are each transmitted by one of the plurality of stations in the set of stations and each uplink transmission of the plurality of uplink transmissions shares identical information with all other uplink transmissions of the plurality of uplink transmissions, wherein the uplink CTS frame is a response to the first downlink frame and protects the wireless channel, and transmit, in response to receiving the uplink CTS frame, a second downlink frame to the set of stations.

12. The wireless device of claim 11, wherein generating the first downlink frame includes:

providing an indication of a scrambling code to be used by the plurality of stations in the set of stations to generate each uplink transmission in the plurality of uplink transmissions.

13. The wireless device of claim 11, wherein generating the first downlink frame includes:

providing an address field, in the first downlink frame, for identifying the set of stations in the wireless network addressed by the first downlink frame, wherein the address field includes one or more group identifiers associated with the set of stations in the wireless network.

14. The wireless device of claim 13, wherein the address field is a Receiver Address (RA) field in a media-access control (MAC) header of the first downlink frame.

15. The wireless device of claim 14, wherein the first downlink frame is a Request-to-Send (RTS) frame.

16. The wireless device of claim 14, wherein generating the first downlink frame, further includes:

providing, in the first downlink frame, scheduling information for a multi-user uplink transmission.

17. The wireless device of claim 16, wherein the scheduling information is for coordinating the multi-user uplink transmissions from the one or more stations.

18. The wireless device of claim 11, wherein the first downlink frame and the uplink CTS frame protect one or more multi-user transmissions during a transmission opportunity set by the first downlink frame and the uplink CTS frame.

19. The wireless device of claim 11, wherein the second downlink frame is a multi-user transmission.

20. The wireless device of claim 11, wherein the uplink CTS frame is a non-high throughput frame.

21. The wireless device of claim 11, wherein the uplink CTS frame is composed of uplink transmissions simultaneously transmitted from the plurality of stations in the set of stations in response to the first downlink frame.

* * * * *